United States Patent [19]

Taguchi et al.

[11] Patent Number: 4,516,687
[45] Date of Patent: May 14, 1985

[54] HANDLE FOR A VESSEL

[75] Inventors: Haruyoshi Taguchi, Osaka; Hideo Tsujimura, Kyoto; Masamichi Imanishi, Ikoma, all of Japan

[73] Assignee: Suntory Limited, Osaka, Japan

[21] Appl. No.: 447,690

[22] Filed: Dec. 7, 1982

[30] Foreign Application Priority Data

Jan. 5, 1982 [JP] Japan ................................ 57-436[U]
Jan. 18, 1982 [JP] Japan .................................. 57-6619
Jan. 26, 1982 [JP] Japan ................................. 57-11278

[51] Int. Cl.³ ............................................ B65D 23/10
[52] U.S. Cl. .............................. 220/94 R; 215/100 A
[58] Field of Search ......................... 220/94 R, 85 H; 215/100 A, 13 R

[56] References Cited

U.S. PATENT DOCUMENTS 3,016,136  1/1962  Poupitch ........................ 220/94 R
3,692,202  9/1972  Parlagreco ..................... 220/94 R
4,176,423  12/1979  Wigemark ..................... 220/94 R

*Primary Examiner*—Stephen Marcus
*Assistant Examiner*—David Voorhees
*Attorney, Agent, or Firm*—Frishauf, Holtz, Goodman & Woodward

[57] ABSTRACT

A vessel with a tabular, flexible handle. The body of the vessel is integrally provided with upper and lower mounts which serve to attach the handle to the vessel. A means for preventing the upper end of the handle from downwardly slipping out of the upper mount and a means for preventing the lower end of the handle from upwardly slipping out of the lower mount are formed integrally with the handle. The lower end of the tubular handle downwardly passes through the upper mount and then through the lower mount. Since the total length of the handle is greater than the distance between the upper edge of the upper mount and the lower edge of the lower mount, the handle can be picked out so as to become bow-shaped, in which position the means for preventing the upper and lower ends of the handle from slipping out of the upper and lower mounts engage with the upper and lower mounts and thereby secure the handle to the vessel.

21 Claims, 25 Drawing Figures

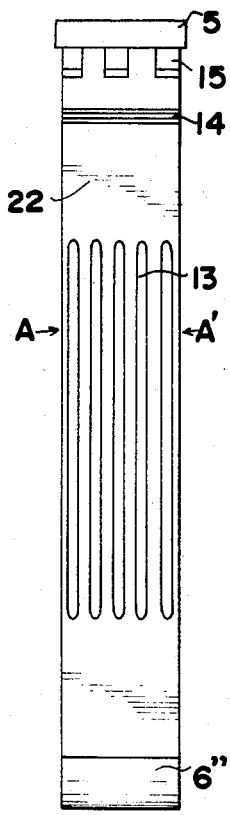
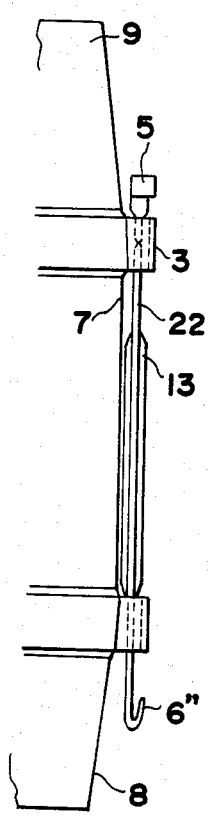
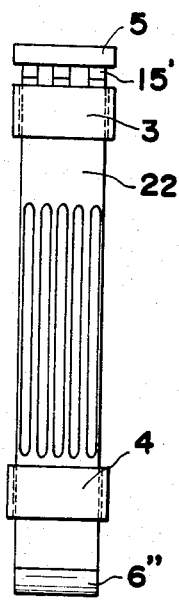
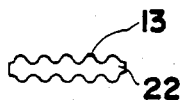

FIG.22
FIG.23
FIG.24
FIG.25
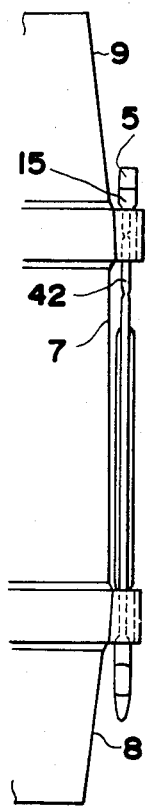
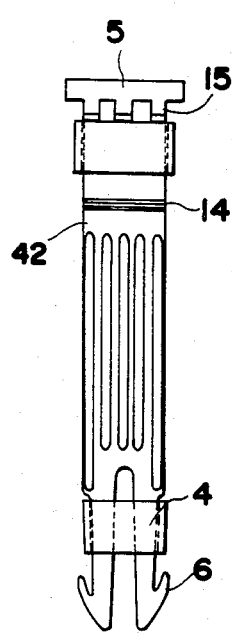
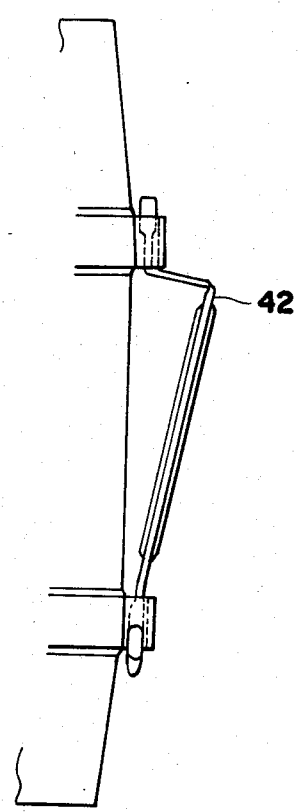
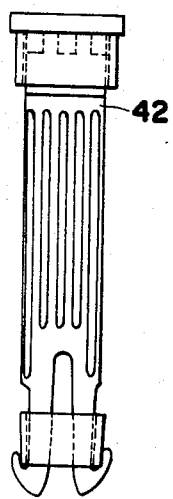

HANDLE FOR A VESSEL

BACKGROUND OF THE INVENTION

The present invention relates to a vessel provided with a handle and having a medium capacity. A "medium capacity" as termed in this specification means about two to five liters. Although a vessel designed to contain this much can be held by both hands even when it is filled to capacity, it would be difficult to hold it by a single hand and take out the contents therefrom if it were not for a handle.

In order to facilitate the discharge of contents in general and the discharge of a liquid in particular, it is already common to provide a handle on the side wall of a vessel having a medium capacity. In most of the conventional cases, however, handles are formed integrally with the bodies of vessels. This causes inconvenience especially when a plurality of such vessels are to be accommodated in a carton which is partitioned into a plurality of compartments, because much space has to be occupied by each vessel and the vessels have to be arranged in such a manner that all the handles are directed in the same direction.

Many of the vessels having a medium capacity and designed to contain beer are provided with upper and lower casings with which bottles or jars are covered. The work of assembling a vessel of this type begins with fitting a bottle or jar in the lower casing. Then the bottle or jar is filled with beer and thereafter covered with the upper casing. In case of a vessel of this type, therefore, it is difficult to form a handle integrally with the body of the vessel. As a matter of course, the handle must be mounted on the vessel only when the latter has been filled with beer.

The present invention is not only highly effective for mounting a handle on a vessel of the above-described type, i.e., on a vessel provided with upper and lower casings, but also applicable to an ordinary medium-capacity vessel which is not provided with upper and lower casings. The body of the vessel in accordance with the present invention is integrally provided with upper and lower mounts which serve to attach a handle to the vessel. Although a vessel to which a handle is attached by means of a mount or mounts is already known, the vessel in accordance with the present invention has a distinctive feature that a handle can be easily attached thereto and occupies little space when attached and allowed to cling to the surface of the body of the vessel. In order to put the handle to use, one has only to pick it out.

SUMMARY OF THE INVENTION

It is an object of the present invention to provide a vessel, the upper and lower portions of the side wall thereof being provided with upper and lower mounts, respectively, which serve to attach a handle to the vessel. Each mount has a pair of transversely spaced opposite arms with a comparatively long cross member therebetween. As a consequence, the horizontal cross section of each mount is in the shape of a short-armed variety of the letter U.

It is another object of the present invention to provide a vessel to which a tabular, flexible handle made of synthetic resin is attached by means of the above-described mounts. The handle is of a greater longitudinal dimension that the distance between the upper edge of the upper mount and the lower edge of the lower mount.

In a preferred embodiment of the invention, the upper end of the handle is provided with a transverse swelling or enlarged portion, whereby a shoulder is formed to provide a seat for abutting against the upper edge of the upper mount so as to prevent the upper end of the handle from downwardly slipping out of the upper mount.

In a preferred embodiment of the invention, the lower end of the handle is formed into bifurcated legs which are provided with barbs projecting outwardly and pointing in the upward direction so that they may be caught on the lower edges of the transversely spaced opposite arms of the lower mount and thereby may prevent the lower end of the handle from upwardly slipping out of the lower mount.

Preferably the vessel in accordance with the present invention comprises a bottle or jar and upper and lower casings with which the bottle or jar is covered, wherein the upper and lower casings are provided with the above-described upper and lower mounts, respectively.

The work of attaching the handle to the vessel is done by first passing the lower end of the handle downwardly through the upper mount, and then through the lower mount. Since the handle is made of a flexible material, and since the barbs provided on the lower end of the handle point in the upward direction, these barbs do not hinder to the downward passage of the lower end of the handle through the upper and lower mounts. Since the handle is in the shape of a plate, it occupies little space when attached and allowed to cling to the surface of the vessel. In order to put the handle to use, one has only to pick it out. The above-described flexibility and longitudinal dimension of the handle permit the handle to become bow-shaped when it is picked out. Then the barbs are caught on the lower edge of the lower mount and, together with the transverse swelling provided on the upper end of the handle, serve to secure the handle to the vessel.

If desired, the means for preventing the upper end of the handle from downwardly slipping out of the upper mount may comprise a pair of barbs which point in the downward direction so as to be caught on the upper edge of the upper mount. The means for preventing the lower end of the handle from upwardly slipping out of the lower mount may comprise a tongue which is bent upwardly so as to be caught on the lower edge of the cross member of the U-shaped lower mount.

Preferably, one or both surfaces of the handle are longitudinally provided with undulatory projections for reinforcement. Preferably, the handle is provided with one or plural transversely thinned portions so as to facilitate the formation of a bow-shape. Preferably, the lower end portion of the handle is narrowed and the inside measurement of the cross member (i.e., the distance between the inner surfaces of the arms) of the upper mount is made larger than that of the lower mount so as to facilitate the downward passage of the handle through the upper and lower mounts.

The vessel in accordance with the present invention may be made of metal or plastic, provided that the upper and lower mounts are formed integrally with the body of the vessel. On the other hand, a necessary condition to be fulfilled by the handle of the present invention is that it should be made of a flexible synthetic resin such as polyethylene, polypropylene, polyvinyl chloride, or a copolymer formed from ethylene and vinyl acetate.

BRIEF DESCRIPTION OF THE DRAWINGS

FIGS. 9 and 10 are a front view and a side view, respectively, illustrating another embodiment of the handle;

FIG. 11 is a transverse cross section taken along line A—A' of FIG. 9;

FIGS. 12 and 13 are a fragmentary side view and a fragmentary front view, respectively, of the vessel to which the handle shown in FIG. 9 is attached and allowed to cling to the body of the vessel;

FIGS. 22 and 23 are a fragmentary side view and a fragmentary front view, respectively, of the vessel to which the handle shown in FIGS. 20 and 21 is attached and allowed to cling to the body of the vessel; and FIGS. 24 and 25 are a fragmentary side view and a fragmentary front view, respectively, of the vessel to which the handle shown in FIGS. 20 and 21 is attached and allowed to become bow-shaped so as to be ready for being held in a hand.

DESCRIPTION OF THE PREFERRED EMBODIMENTS

Figure 1:
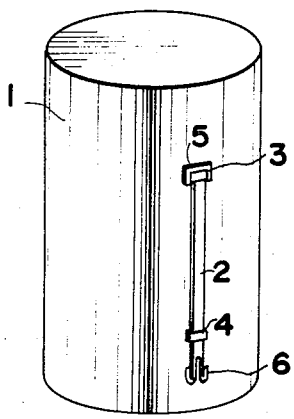
FIG. 1 is a perspective view of a vessel according to the present invention.

Referring now to FIG. 1, a vessel in accordance with the present invention includes the body 1 of the vessel and a handle 2 attached to the body 1 by means of an upper mount 3 and a lower mount 4. A means 5 for preventing the upper end of the handle 2 from downwardly slipping out of the upper mount 3 and a means 6 for preventing the lower end of the handle 2 from upwardly slipping out of the lower mount 4 are formed integrally with the handle 2.

Figure 2:
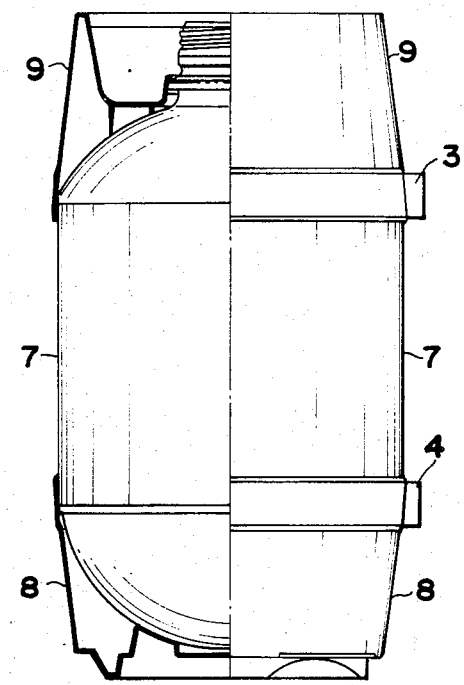
FIG. 2 is a front view thereof, with its left half broken away to expose the interior structure.

FIG. 2 shows a vessel to which the present invention can be most suitably applied. As shown in the left half of FIG. 2, this vessel comprises of a bottle or jar 7, lower casing 8 and upper casing 9.

Figure 3:
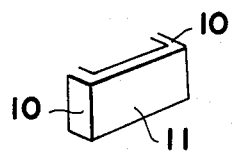
FIGS. 3 and 4 are a perspective view and a plan view, respectively, of a mount to be provided on the vessel.
Figure 4:

Referring now to FIGS. 3 and 4, either of the upper and lower mounts 3 and 4 has a pair of transversely spaced opposite arms 10 with a comparatively long cross member 11 therebetween. Preferably, the inside measurement of the cross member 11 (i.e., the distance between the inner surfaces of arms 10) of the upper mount 3 is made somewhat larger than that of the lower mount 4.

Figure 5:
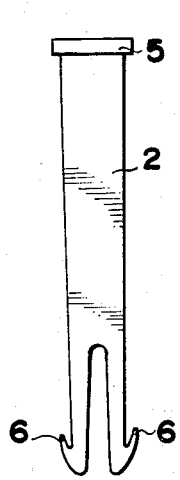
FIG. 5 is a front view of an example of the handle.
Figure 19:
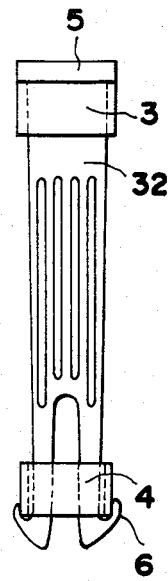

In a basic example of the handle 2 shown in FIG. 5, the means 5 for preventing disengagement of the upper part of the handle comprises a transverse swelling or bulge which is larger in thickness and/or width than the inside measurement of the arms 10 and/or the cross-member 11 of the upper mount 3, while the means 6 for preventing disengagement of the lower part of the handle comprises bifurcated legs which are provided with barbs projecting outwardly and pointing in the upward direction. When the handle 2 is attached to the vessel and allowed to become bow-shaped so as to be ready for being held in a hand, the barbs are caught on the lower edges of the arms 10 of the lower mount 4 as shown in FIG. 19, so as to firmly secure the lower end of the handle 2 to the vessel.

Figure 6:
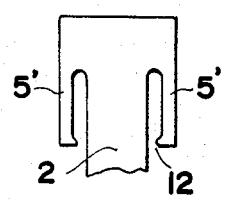
FIGS. 6 and 7 are fragmentary front views illustrating an embodiment of the upper and lower ends, respectively, of the handle.

Another embodiment of the disengagement preventing means 5' comprises, as shown in FIG. 6, of a pair of barbs 5' which project sideways from the upper end of the handle 2 and point in the downward direction so as to be caught on the upper edges of the arms 10 of the upper mount 3 as shown in FIG. 1. As occasion demands, each barb 5' is provided with an inwardly directed projection 12, which is to be caught on the lower edge of the arm 10 of the upper mount 3 and thereby prevent the barb 5' from upwardly sipping out of the arm 10.

Figure 7:
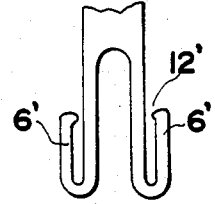

FIG. 7 shows another embodiment of the disengagement preventing means 6', in which each barb 6' is provided with an inwardly directed projection 12' to engage the lower mount 4.

Figure 8:
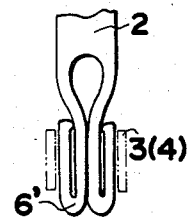
FIG. 8 is a schematic drawing of how the lower end of the handle of FIG. 7 is allowed to downwardly pass through a mount in accordance with the teachings of the present invention.

The handle 2 is made of a flexible material. As shown in FIG. 8, when the means 6' of FIG. 7 is passed through the upper and lower mounts 3 and 4, the bifurcated portions of the means 6' are moved toward each other until they are brought into tight contact with each other.

Figure 14:
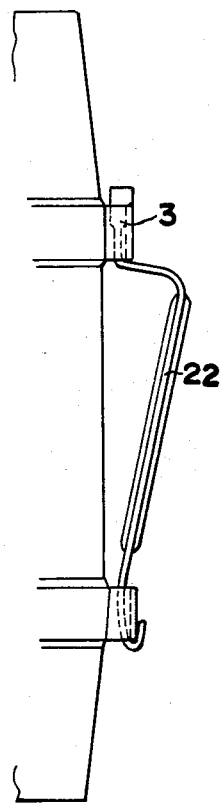
FIGS. 14 and 15 are a fragmentary side view and a fragmentary front view, respectively, of the vessel to which the handle shown in FIG. 9 is attached and allowed to become bow-shaped so as to be ready for being held in a hand.
Figure 15:
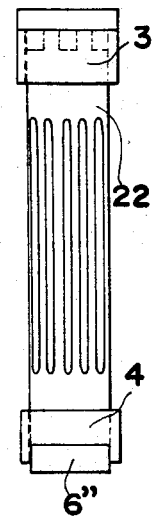

Referring now to FIGS. 9 to 15, another embodiment of the handle 22' is characterized by a plurality of undulatory projections 13 longitudinally provided on both surfaces of the handle 22', a transversely thinned portion 14 provided midway between the transverse swelling or enlarged portion 5 and the upper ends of the undulatory projections 13, and three longitudinal short swellings or enlarged portions 15 provided contiguously to the transverse swelling 5. The longitudinal short swellings 15 have such a thickness that they tightly fit into the upper mount 3 as shown in FIG. 14, so as to secure the upper end of the handle 2 to the upper mount 3, for example when the handle is bowed out. The disengagement preventing means of handle 22 comprises a tongue 6 which is bent upwardly as shown in FIGS. 10 and 12. When the handle 22 is attached to the vessel and allowed to become bow-shaped so as to be ready for being held in a hand, the tongue 6' is caught on the lower edge of the cross member 11 of the lower mount 4 as shown in FIGS. 14 and 15, so as to secure the lower end of the handle 22 to the lower mount 4. Since the handle 22 is made of a flexible material, and since the tongue 6" is bent upwardly, the tongue 6" does not hinder the downward passage of the lower end of the handle 22 through the upper and lower mounts 3 and 4. As shown in FIG. 14, the undulatory projections 13 serve to reinforce the hand-grip portion of the handle 22 and make the handle 22 easy to grip. The transversely thinned portion 14 facilitates the formation of a bow-shape so as to make the handle 22 easy to grip. The undulatory portions 13 should not be so enlarge as to make the handle 22 incapable of passage through the upper mount 3.

Figure 16:
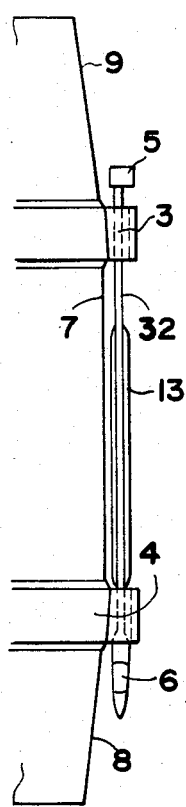
FIGS. 16 and 17 are a fragmentary side view and a fragmentary front view, respectively, of the vessel to which still another embodiment of the handle is attached and allowed to cling to the body of the vessel.
Figure 17:
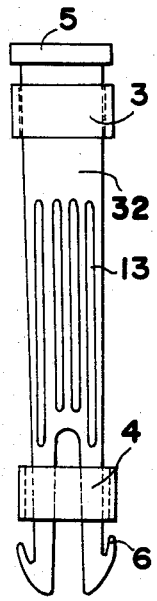
Figure 18:
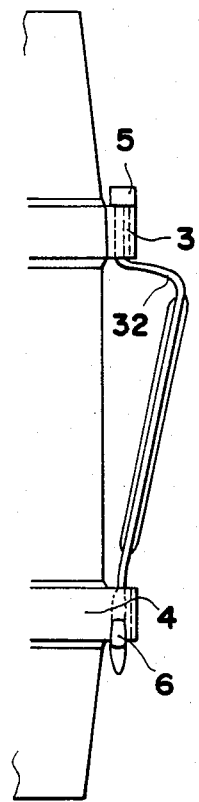
FIGS. 18 and 19 are a fragmentary side view and a fragmentary front view, respectively, of the vessel to which the handle shown in FIGS. 16 and 17 is attached and allowed to become bow-shaped so as to be ready for being held in a hand.

The handle 22 shown in FIGS. 16 to 19 is the same as shown in FIG. 5 except that the undulatory projections 13 are longitudinally provided on both surfaces thereof and that the disengagement preventing means 6 is thicker than that shown in FIG. 5 (see FIGS. 16 and 18). The undulatory projections 13 have the same effect as mentioned in the preceding paragraph with respect to FIGS. 9 to 15.

Referring now to FIGS. 20 to 25, two transversely thinned portions 14 and three longitudinal short swellings or enlarged portions 15 are added to the handle 22 shown in FIGS. 16 to 19 to further improve same. Five undulatory projections 13, instead of four in FIGS. 16 to 19, also characterize the handle 42 shown in FIGS. 20 to 25. Further, the lower end of the handle 42 is somewhat narrowed so as to facilitate the downward passage of the handle 42 through the lower mount 4. Further, the distance between the outside edges of the bifurcated legs 6 of the handle is so small that the bifurcated legs 6 can pass through the upper mount by its own weight and a light push and the length of the cross member 11 of the lower mount is so small that the barbs 6 can catch the arms 10 of the lower mount. The means 6 is made thicker in the same manner as shown in FIGS. 16 and 18.

Reference is now specifically made to how the handles of the invention should be attached to the vessel and how it should be put to use.

The work of assembling a vessel shown in FIG. 2 begins with fitting a bottle or jar 7 in the lower casing 8. Then the bottle or jar 7 is filled with a substance for which the vessel is intended. Thereafter, the bottle or jar 7 is covered with the upper casing 9.

In case of the vessel shown in FIG. 1, the upper and lower mounts 3 and 4 are provided on one and the same body in vertically spaced positions. In case of the vessel shown in FIG. 2, however, the upper mount 3 is provided on the upper casing 9 while the lower mount 4 is provided on the lower casing 8. This difference requires special care to be taken to vertically align the upper mount 3 with the lower mount 4 at the time of covering the bottle or jar 7 with the upper casing 9.

Attaching the handle 2, 22, 32 or 42 to the vessel is done by allowing the lower end of the handle to downwardly pass through the upper mount 3 in the first place, and then through the lower mount 4. Since the handle is made of a flexible material, and since the barbs provided on the lower end of the handle point in the upward direction, the distance between the tips of the barbs may be greater to some extent than the inside measurements of the cross members 11 of the upper and lower mounts 3 and 4. For example, let it be supposed that the cross members 11 (i.e., the spacing between the inside surfaces of arms 10) of the upper and lower mounts 3 and 4 of the handles shown in FIGS. 5, 16 and 20 have an inside measurement of 18 to 24 mm. Then the distance between the tips of the barbs may be greater than that by about 4 mm. The undulatory portions 13 should not be so projecting as to make the handle incapable of passage through the upper mount 3. Preferably, the thickness of the handles including the undulatory portions 13 is smaller by about 0.5 mm than the inside measurement of the arms 10 of the upper mount 3. The more closely the thickness of the handles including the undulatory portions 13 is approximated to the inside measurement of the arms 10 of the upper mount 3, the more difficult it becomes for the handles to pass through the upper mount 3. On the other hand, if the thickness of the handles including the undulatory portions 13 is excessively smaller than the inside measurement of the arms 10 of the upper mount 3, the lower end of the handles may go astray after passage through the upper mount 3 and fail to reach the lower mount 4.

Figure 20:
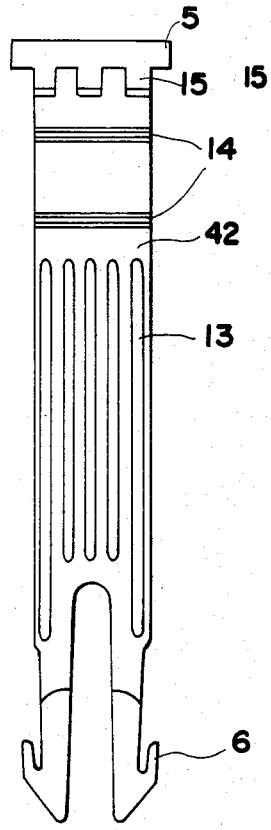
FIGS. 20 and 21 are a front view and a side view, respectively, illustrating yet still another embodiment of the handle.
Figure 21:
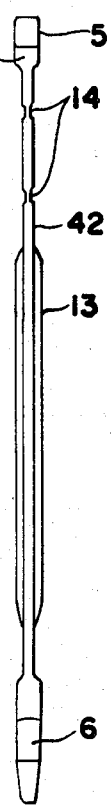

Except for the case where the handles shown in FIG. 5, 16 or 20 are adopted, the inside measurement of the cross member 11 of the lower mount 4 may be equal to that of the cross member 11 of the upper mount 3. The former is preferably made smaller than the latter by 2 to 3 mm in case where the handle shown in FIG. 5, 16 or 20 is adopted. This preferability is derived from the above-mentioned maximum permissible distance between the tips of the barbs provided on the lower end of the handles shown in FIG. 5, 16 or 20. That is to say, the distance therebetween can be made greater than the inside measurements of the cross members 11 of the lower mount 4 only by about 4 mm at the most. If the inside measurements of both cross members 11 are made equal to each other, the cross member 11 of the lower mount 4 may be too long to allow the barbs to be caught on the lower edges of the arms 10 of the lower mount 4. Preferably, the inside of each mount form an inverted trapezoid so that an opening formed thereby may be wide at the top and slightly narrowing at the bottom so as to facilitate the downward passage of the handle. One of the most preferable embodiments suited for a vessel having a capacity of 2 to 3 liters is shown in FIGS. 17 and 23 by way of example. In this case, the inside measurements of the cross members 11 of the upper and lower mounts 3 and 4 are 23 and 20 mm, respectively, while the maximum distance between the barbs provided on the lower end of the handle 2 is 27 mm.

Since the handles of the invention are generally in the shape of a plate, they occupy little space when attached and allowed to cling to the side of the vessel as shown in FIGS. 12, 16 and 22. In order to put the handles to use, one has only to pick it out so that the means 6, 6' or 6" may be caught on the lower edge of the lower mount 4 and the shoulder formed by the means 5 may be allowed to abut against the upper edge of the upper mount 3.

The handles should be sturdy enough to free a user from uneasiness about its strength, especially in view of the considerable weight to be applied to his hand when he holds a vessel having a capacity of 2 to 3 liters. In addition, the handle should not become loose or distorted to such an extent that it becomes unfit for the stable discharge of contents from the vessel. These requirements will be met by allowing the handgrip portion of the handle (designated by A—A' in FIG. 9) to have a width of 18 to 26 mm (preferably 21 to 24 mm) and by allowing the total length of the handle to be greater than the distance between the upper edge of the upper mount 3 and the lower edge of the lower mount 4 by 10 to 20 mm (preferably 13 to 17 mm). These preferable measurements were obtained from a test conducted with 60 panelists requested to try handles of various measurements.

The preferable number of longitudinal short swellings 15, which are to be provided in a preferred embodiment of the invention contiguously to the transverse swelling 5 as shown in FIGS. 9 and 20, is two to eight. They should have such a thickness as to tightly fit into the upper mount 3 so as to secure the upper end of the handle to the upper mount 3. The preferable number of undulatory projections 13, which are to be provided in a preferred embodiment of the invention to make the handle easy to grip and reinforce the hand-grip portion thereof, is four to six. The transversely thinned portions 14 shown in FIGS. 9 and 20 are provided only when the properties of the material require such portions for facilitating the formation of a bow-shape.

In order to temporarily put the handles of the invention out of use, one has only to press the hand-grip portion of the handle against the body 1 of the vessel. Then the means 5 and 6 will be easily disengaged from the upper and lower mounts 3 and 4, respectively, and the handle will be allowed to cling to the side of the vessel again.

From the foregoing, it will be apparent that the present invention permits a medium-capacity vessel to be provided with a handle which occupies little space and can be easily put to or out of use merely by picking it out or by pressing the handgrip portion thereof against the body of the vessel. According to the present invention, even a vessel consisting of a bottle or jar, a lower casing and an upper casing can be easily provided with a handle, although it has in the past been considered difficult to provide such a vessel with a handle.

What is claimed is:

1. A vessel with a handle, comprising:
a vessel having a side wall; and upper and lower spaced apart mounts on the upper and lower portions of said side wall, respectively, each of said upper and lower mounts being generally U-shaped and having a pair of transversely spaced opposite arms extending from said side wall of said vessel and a comparatively long cross member extending therebetween such that each of said upper and lower mounts is in the shape of a short-armed letter U and defines an opening of given length between the respective mount and the side wall of the vessel, the upper mount defining an opening of greater length between its opposite arms than said lower mount; and
a generally tabular, flexible elongated handle made of synthetic resin and adapted to be attached to said vessel by passing through and engaging both of said upper and lower mounts, said handle having a greater longitudinal length than the distance between an upper edge of said upper mount and a lower edge of said lower mount, said handle comprising first disengagement preventing means for preventing the upper end of said handle from downwardly slipping out of said upper mount and second disengagement preventing means passable through both said upper and lower mounts in said downward direction and for preventing the lower end of said handle from upwardly slipping out of said lower mount, said upper mount having upper and lower edges;
said first disengagement preventing means for preventing the upper end of said handle from downwardly slipping out of said upper mount comprising a pair of barbs which project sideways from the upper end of said handle and point in the downward direction of said handle, for engaging upper edges of said transversely spaced opposite arms of said upper mount;
said barbs having free end portions, and projections on said free end portions which project inwardly toward said handle to engage lower edges of said transversely spaced opposite arms of said upper mount to prevent disengagement of said barbs from said upper mount and preventing said upper end of said handle from upwardly slipping out of engagement with said upper mount; and
said handle having an upper portion and a lower portion, said upper portion having a width greater than that of said lower portion such that said lower portion is passable through the openings defined by both said upper and lower mounts and said upper portion is passable only through the opening defined by said upper mount.

2. A vessel with a handle, comprising:
a vessel having a side wall; and upper and lower spaced apart mounts on the upper and lower portions of said side wall, respectively, each of said upper and lower mounts being generally U-shaped and having a pair of transversely spaced opposite arms extending from said side wall of said vessel and a comparatively long cross member extending therebetween such that each of said upper and lower mounts is in the shape of a short-armed letter U and defines an opening of given length between the respective mount and the side wall of the vessel, the upper mount defining an opening of greater length between its opposite arms than said lower mount; and
a generally tabular, flexible elongated handle made of synthetic resin and adapted to be attached to said vessel by passing through and engaging both of said upper and lower mounts, said handle having a greater longitudinal length than the distance between an upper edge of said upper mount and a lower edge of said lower mount, said handle comprising first disengagement preventing means for preventing the upper end of said handle from downwardly slipping out of said upper mount and second disengagement preventing means passable through both said upper and lower mounts in said downward direction and for preventing the lower end of said handle from upwardly slipping out of said lower mount;
said handle having an upper portion and a lower portion, said upper portion having a width greater than that of said lower portion such that said lower portion is passable through the openings defined by both said upper and lower mounts and said upper portion is passable only through the opening defined by said upper mount; and
said first disengagement preventing means for preventing the upper end of said handle from downwardly slipping out of said upper mount comprising a transverse enlargement provided at the upper end portion of said handle, at least one of the thickness and width of said transverse enlargement being larger respectively than the inside length of said opening defined by said transversely spaced opposite arms and said cross member of said upper mount.

3. The vessel of claim 2, wherein said vessel comprises a bottle covered with upper and lower casings having respective side walls, said upper and lower mounts being provided on said side walls of said upper and lower casings, respectively.

4. The vessel of claim 2 or 3, wherein said handle comprises a plurality of longitudinal short swellings provided on said upper end portion of said handle contiguously to said transverse enlargement of the upper end of said handle, said longitudinal short swellings having a thickness such that they fit tightly into the opening of said upper mount so that said handle is maintained in a manually grippable position by said tight fit.

5. The vessel of any one of claims 2, 3 or 1, wherein said cross member of said lower mount has a lower edge, and said second disengagement preventing means for preventing the lower end of said handle from upwardly slipping out of said lower mount comprises an upwardly bent tongue which is adapted to engage the lower edge of said cross member of said lower mount.

6. The vessel of any one of claims 2, 3 or 1, wherein said transversely spaced opposite arms of said lower mount have respective lower edges, and said second disengagement preventing means for preventing the lower end of said handle from upwardly slipping out of said lower mount comprises respective bifurcated legs which are provided with barbs projecting outwardly in opposite directions and pointing in the upward direction, said barbs being adapted to respectively engage the lower edges of said transversely spaced opposite arms of said lower mount.

7. The vessel of claim 6, wherein said barbs have upwardly pointing free end portions, and projections on said free end portions which project inwardly toward said handle.

8. The vessel of claim 2, 3 or 1, wherein said handle has at least one surface which is provided with a plurality of undulatory projections extending longitudinally of said handle to stiffen the portion of said handle portion on which said undulatory projections are provided.

9. The vessel of claim 2, 3 or 1, wherein said handle comprises at least one transversely thinned flexible portion which is more flexible than the remainder of said handle to increase the flexibility thereof at said transversely thinned portion.

10. The vessel of claim 2, 3 or 1, wherein the inside length of said cross member of said lower mount is smaller than the inside length of said cross member of said upper mount; and the width of the portion of said handle passed through said lower mount is smaller than the width of an intermediate portion of the handle which serves as a grip portion of said handle.

11. The vessel of claim 2, 3 or 1, wherein said vessel has a capacity of about 2 to 3 liters; the hand-grip prtion of said handle has a width of about 18 to 24 mm; and the total length of said handle is greater than the distance between the upper edge of said upper mount and the lower edge of said lower mount by about 10 to about 20 mm.

12. The vessel of claim 6, wherein said transversely spaced opposite arms of said lower mount have respective upper edges, and said projections on said free end portion of said barbs engage said upper edges of said transversely spaced opposite arms of said lower mount to prevent said lower end of said handle from downwardly slipping out of said lower mount.

13. The vessel of claim 8, wherein said undulatory projections are dimensioned such that the portion of said handle having said undulatory projections thereon provide a close sliding fit with the interior of the opening of said upper mount, said upper mount having substantially straight inner surfaces against which said handle portion with said undulatory projections engage during insertion of said handle through said upper mount, thereby guiding said handle straight down toward said lower mount.

14. The vessel of claim 9, wherein said handle comprises two of said transversely thinned flexible portions, said transversely thinned flexible portions being located at the upper portion of said handle, at least one of said transversely thinned flexible portions being closely adjacent said transverse enlargement at said upper end portion of said handle and the other of said transversely thinned flexible portions being spaced downwardly from said one transversely thinned flexible portion, whereby said one transversely thinned flexible portion is located adjacent the lower edge of said upper mount when said upper portion of said handle is in its lowermost position relative to said upper mount, said handle bending outwardly from said vessel at said first transversly thinned flexible portion and bearing against the lower edge of said upper mount in the vicinity of said first transversely thinned flexible portion to substantially lock said handle member in position with said upper end of said handle in its downward most position and an intermediate portion of said handle being spaced from said vessel to provide a manually grippable portion.

15. The vessel of claim 14, wherein said handle has at least one surface at said manually grippable intermediate portion which is provided with a plurality of undulatory projections extending longitudinally of said handle to stiffen said handle portion on which said undulatory projections are provided.

16. A vessel with a handle, comprising:
a vessel having a side wall; and upper and lower spaced apart mounts on the upper and lower portions of said side wall, respectively, each of said upper and lower mounts being generally U-shaped and having a pair of transversely spaced opposite arms extending from said side wall of said vessel and a comparatively long cross member extending therebetween such that each of said upper and lower mounts is in the shape of a short-armed letter U and defines an opening of given length between the respective mount and the side wall of the vessel, the upper mount defining an opening of greater length between its opposite arms than said lower mount; and
a generally tabular, flexible elongated handle made of synthetic resin and adapted to be attached to said vessel by passing through and engaging both of said upper and lower mounts, said handle having a greater longitudinal length than the distance between an upper edge of said upper mount and a lower edge of said lower mount, said handle comprising first disengagement preventing means for preventing the upper end of said handle from downwardly slipping out of said upper mount and second disengagement preventing means passable through both said upper and lower mounts in said downward direction and for preventing the lower end of said handle from upwardly slipping out of said lower mount;
said handle having an upper portion and a lower portion, said upper portion having a width greater than that of said lower portion such that said lower portion is passable through the openings defined by both said upper and lower mounts and said upper portion is passable only through the opening defined by said upper mount; and said handle comprising at least one transversely thinned flexible portion which is more flexible than the remainder of said handle to increase the flexibility of said handle at said transversely thinned portion, said transversely thinned flexible portion being located closely adjacent said upper end of said handle such that said transversely thinned flexible portion is located adjacent a lower edge of said upper mount when said upper portion of said handle is in its lowermost position relative to said upper mount, said handle bending outwardly from said vessel at said transversely thinned flexible portion and bearing against the lower edge of said upper mount at said transversely thinned flexible portion to substantially lock said handle member in position with said upper end of said handle in its downward most position and an intermediate portion of said handle being spaced from said vessel to provide a manually grippable portion.

17. The vessel of claim 16, wherein said handle has at least one surface at said manually grippable intermediate portion which is provided with a plurality of undulatory projections extending longitudinally of said handle to stiffen said handle portion on which said undulatory projections are provided.

18. The vessel of claim 16, further comprising at least a second transversely thinned flexible portion downwardly spaced from said first mentioned transversely thinned flexible portion for providing a substantially sharp bend when said handle is in position to provide said manually grippable portion, the portion of said handle between said transversely thinned flexible portions being substantially straight.

19. A vesssel with a handle, comprising:

a vessel having a side wall; and upper and lower spaced apart mounts on the upper and lower portions of said side wall, respectively, each of said upper and lower mounts being generally U-shaped and having a pair of transversely spaced opposite arms extending from said side wall of said vessel and a comparatively long cross member extending therebetween such that each of said upper and lower mounts is in the shape of a short-armed letter U and defines an opening of given length between the respective mount and the side wall of the vessel, the upper mount defining an opening of greater length between its opposite arms than said lower mount; and a generally tabular, flexible elongated handle made of synthetic resin and adapted to be attached to said vessel by passing through and engaging both of said upper and lower mounts, said handle having a greater longitudinal length than the distance between an upper end of said upper mount and a lower edge of said lower mount, said handle comprising first disengagement preventing means for preventing the upper end of said handle from downwardly slipping out of said upper mount and second disengagement preventing means passable through both said upper and lower mounts in said downward direction and for preventing the lower end of said handle from upwardly slipping out of said lower mount;

the width of the lower portion of said handle passed through said opening defined by said lower mount being smaller than the width of both the upper end of said handle and an intermediate portion of said handle which serves as a grip portion of said handle so that only said lower portion of said handle is passable through said opening of said lower mount;

said handle, at a portion thereof in the vicinity of the lower end thereof, having stop means thereon which is pasable through said opening of said upper mount but which is not passable through said opening of said lower mount for preventing said handle from passing through said lower mount more than a predetermined distance;

said stop means being located such that a portion of said handle extends above said upper mount when said stop means stoppingly engages said lower mount;

whereby said stop means facilitates opening said handle to a gripping position by pushing on said upper end thereof and pulling outwardly on an intermediate portion thereof.

20. The vessel of claim 19, wherein said handle is dimensioned to slide through said upper mount with only a small amount of play therebetween, such that said upper mount serves as a guide member for guiding said handle through said upper mount and into said lower mount.

21. A vessel with a handle, comprising:

a vessel having a side wall; and upper and lower spaced apart mounts on the upper and lower portions of said side wall, respectively, each of said upper and lower mounts being generally U-shaped and having a pair of transversely spaced opposite arms extending from said side wall of said vessel and a comparatively long cross member extending therebetween such that each of said upper and lower mounts is in the shape of a short-armed letter U and defines an opening of given length between the respective mount and the side wall of the vessel, the upper mount defining an opening of greater length between its opposite arms than said lower mount; and a generally tabular, flexible elongated handle made of synthetic resin and adapted to be attached to said vessel by passing through and engaging both of said upper and lower mounts, said handle having a greater longitudinal length than the distance between an upper end of said upper mount and a lower edge of said lower mount, said handle comprising first disengagement preventing means for preventing the upper end of said handle from downwardly slipping out of said upper mount and second disengagement preventing means passable through the openings defined by both said upper and lower mounts in said downward direction and for preventing the lower end of said handle from upwardly slipping out of said lower mount;

said upper mount having inner guide surfaces which are substantially straight and substantially vertically arranged;

said handle being dimensioned and having substantially straight surfaces which slide through said guide surfaces of said upper mount with only a small amount of play therebetween, such that said upper mount serves as a guide member for guiding said handle vertically through said opening of said upper mount and into said opening of said lower mount, while substantially preventing sidewise or transverse movement of said handle as it passes through said openings of said upper mount towards said lower mount; and said handle having an upper portion and a lower portion, said upper portion having a width greater than that of said lower portion such that said lower portion is passable through the openings defined by both said upper and lower mounts and said upper portion is passable only through the opening defined by said upper mount.

* * * * *